United States Patent
Naveed et al.

Patent Number: 5,982,640
Date of Patent: Nov. 9, 1999

[54] ARRANGEMENT FOR REDUCING THE EFFECTS OF CAPACITIVE COUPLING IN A CONTROL CIRCUIT FOR A SWITCHED-MODE POWER SUPPLY

[75] Inventors: Majid Naveed, Mohegan Lake, N.Y.; Edwin Kluter, Nijmegen, Netherlands; Erwin Seinen, Malden, Netherlands; Robert J. Fronen, Nijmegen, Netherlands; Ton Mobers, Grave, Netherlands

[73] Assignee: Philips Electronics North America Corporation, New York, N.Y.

[21] Appl. No.: 09/017,919

[22] Filed: Feb. 3, 1998

[51] Int. Cl.$^6$ .................................................. H02M 3/335
[52] U.S. Cl. .................................. 363/21; 363/49; 363/56
[58] Field of Search .................................. 363/19, 20, 21, 363/49, 50, 55, 56, 78, 79, 80, 97, 131

[56] References Cited

U.S. PATENT DOCUMENTS

| | | | |
|---|---|---|---|
| 5,757,627 | 5/1998 | Faulk | 363/21 |
| 5,812,383 | 9/1998 | Majid et al. | 363/21 |
| 5,852,550 | 12/1998 | Majid et al. | 363/21 |

*Primary Examiner*—Peter S. Wong
*Assistant Examiner*—Y. J. Han
*Attorney, Agent, or Firm*—Edward W. Goodman

[57] ABSTRACT

In a switched-mode power supply, when the controller and the switching device are encapsulated together with a heat sink, in which the drain of the switching device is connected to the heat sink, the heat sink and the paths to the various pins of the controller forms various parasitic capacitances which, when the switching device switches, injects and withdraws inordinately large currents into and from the pins of the controller. In the case of the $V_{CTRL}$ pin to which is connected a discharge capacitor, the resulting under voltage across the capacitor may be used by circuitry connected to the $V_{CTRL}$ pin to control the switching of the switching device resulting in throwing the switched-mode power supply out of regulation. A track-and-hold circuit is now connected between the $V_{CTRL}$ pin and the circuitry to mirror the voltage across the discharge capacitor. During the times when current would be withdrawn from the discharge capacitor due to capacitance coupling, the track-and-hold circuit isolates the circuitry from the resulting under voltage.

4 Claims, 12 Drawing Sheets

ARRANGEMENT FOR REDUCING THE EFFECTS OF CAPACITIVE COUPLING IN A CONTROL CIRCUIT FOR A SWITCHED-MODE POWER SUPPLY

BACKGROUND OF THE INVENTION

1. Field of the Invention

The subject invention relates to multi-chip modules for switched-mode power supplies.

2. Description of the Related Art

A switched-mode power supply, as disclosed in co-pending U.S. patent application Ser. No. 08/903,779, filed Jul. 31, 1997 (PHA 23,264), assigned to the Assignee of the subject application, includes a controller chip and a switching device for switching the power in a primary winding of a power transformer. In these supplies, the switching device and the controller chip are typically combined in a single encapsulated module, complete with a heat sink. The switching devices are typically vertical diffused MOSFETs (VDMOS) in which the drain is connected to the heat sink. As such, the connections to the various pins of the controller chip and the heat sink act as parasitic capacitors resulting in the application (and withdrawal) of induced currents to and from the pins of the controller chip. Depending on the functions of the affected pins, the operation of the controller chip may be seriously compromised.

One area of concern is the sample-and-hold portion of the controller chip. Co-pending U.S. patent application Ser. No. 08/901,491, filed Jul. 28, 1997 (PHA 23,262), assigned to the Assignee of the present invention, discloses a sample-and-hold circuit for a controller in a switched-mode power supply. In particular, the sample-and-hold circuit is used for sensing the output voltage of the switched-mode power supply and for regulating the switching device in controlling the output voltage. If a too large induced current is withdrawn from a capacitor connected to a pin of the controller connected to the output of the sample-and-hold circuit, the controller then erroneously uses the resulting too small voltage across the capacitor in regulating the switching of the switching device thereby taking the switched-mode power supply out of regulation.

SUMMARY OF THE INVENTION

It is an object of the present invention to sense undesired induced currents in the controller of a switched-mode power supply and to prevent these induced currents from taking the switched-mode power supply out of regulation.

The above object is achieved in a controller for controlling a switched-mode power supply having a transformer with a primary winding, an auxiliary winding and a secondary winding, and a switching transistor coupled in series with the primary winding, a voltage on said auxiliary winding being dependent on an output voltage on said secondary winding, said controller having an input coupled to said auxiliary winding for receiving a current proportional to said voltage, and a control terminal having a discharge capacitor coupling the control terminal to ground, a voltage across said discharge capacitor being used by circuitry in said controller for controlling the switching of said switching device, a sample-and-hold circuit having an input coupled to the input of the controller for receiving said current, a comparator for comparing said current to a reference current, and a controllable switch having an input coupled to receive said current, an output coupled to said control terminal of said controller, and a control input coupled to an output of said comparator, characterized in that said controller further comprises a track-and-hold circuit coupled between said control terminal and said circuitry in said controller, said track-and-hold circuit having a control input also coupled to the output of said comparator in said sample-and-hold circuit, whereby, under normal operating conditions, said track-and-hold circuit mirrors the voltage across said discharge capacitor, and whereby under abnormal conditions in which capacitive coupling induces a large current in said discharge capacitor, said track-and-hold circuit isolates said circuitry in the controller from an erroneous voltage across said discharge capacitor due to induced large current.

Applicants recognized that during the "hold" times of the sample-and-hold circuit, the voltage across discharge capacitor was adversely affected by capacitive coupling, i.e., the negative change in voltage on the drain of the switching device caused current to be withdrawn from the $V_{CTRL}$ terminal of the controller which pulled down the voltage across the discharge capacitor excessively. This too low voltage was then being used by the controller in setting the duty cycle of the switching device. Applicants found that by integrating a track-and-hold circuit in the controller IC and by activating the track-and-hold circuit by the same switching signal as is present in the sample-and hold circuit, the track-and-hold circuit is able to mirror to desired voltage across the discharge capacitor, while, at the same time, the effects of the capacitive coupling on the control of the power supply could be minimized.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
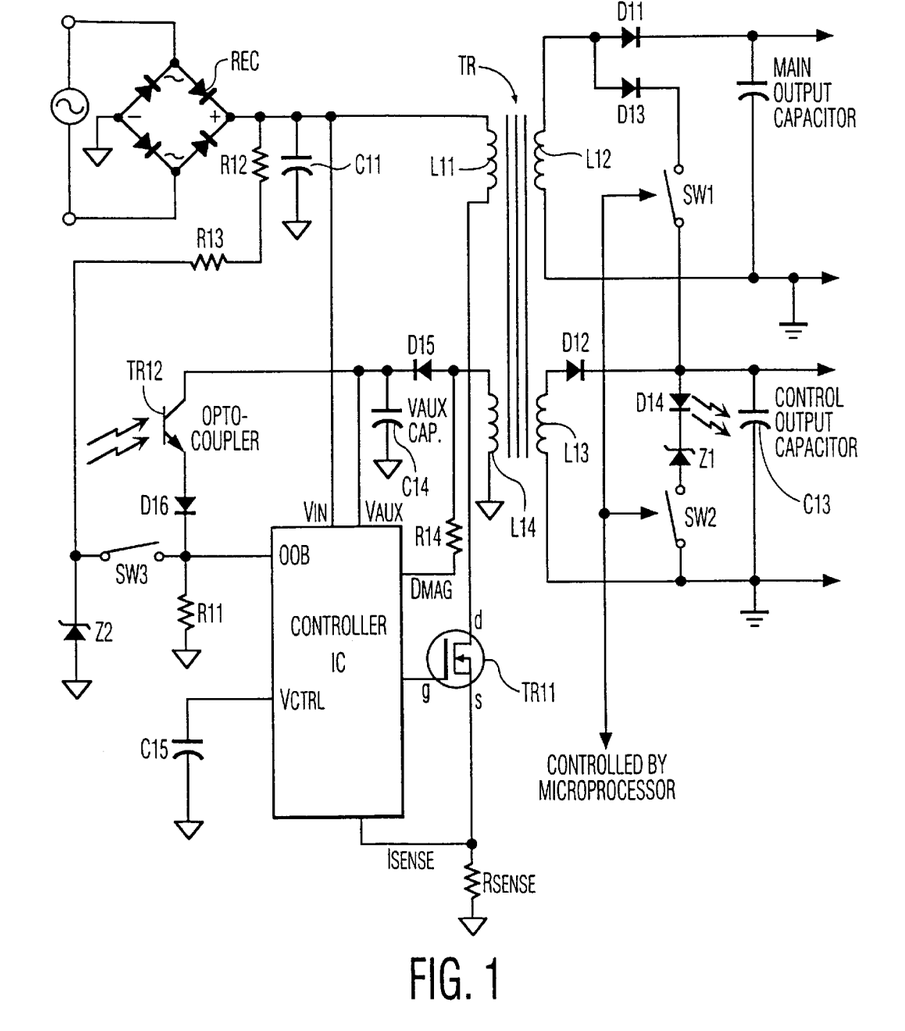
FIG. 1 is a circuit diagram of a switched-mode power supply.

FIG. 1 shows a schematic diagram of a known switched-mode power supply. In particular, a diode rectifier bridge REC is connected to a line voltage source. An output from the rectifier bridge REC is connected to ground through a capacitor C11 and to one end of a primary winding L11 of a transformer TR. The other end of primary winding L11 is connected to one terminal of a switching device Tr11, the other terminal of which being connected to ground through a sense resistor $R_{SENSE}$. A first secondary winding L12 of the transformer TR has a first end and a second end connected to each other through a series arrangement of a diode D11 and a main output capacitor C12, the second end of the first secondary winding L12 also being connected to ground. A load (not shown) may be connected across the main output capacitor C12.

The transformer TR also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first primary winding L12 is also connected via a diode D13 and a controllable switch Sw1 to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR further includes an auxiliary primary winding L14 which has one end connected to a diode D15, and then to ground through a $V_{AUX}$ capacitor C14, to a $V_{AUX}$ input of a controller IC, and to one terminal of a light sensor Tr12 of the opto-coupler, the other terminal of the light sensor Tr12 being connected to ground via resistor R11, and to a stand-by mode detecting input (OOB) of the controller IC. In addition, a series arrangement of two resistors, R12 and R13, and a Zener diode Z2 connect the output of the rectifier bridge REC to ground. The junction between resistor R13 and Zener diode Z2 is connected to the OOB input via a power switch Sw3. The other end of the auxiliary primary winding L14 is connected to ground. The controller IC also has a $V_{IN}$ input connected to the output of the rectifier bridge REC, a $D_{MAG}$ input connected through a resistor R14 to the one end of the auxiliary primary winding L14, a driver output connected to the control input of switching device Tr11, an $I_{SENSE}$ input connected to the resistor $R_{SENSE}$, and a $V_{CTRL}$ terminal connected to ground by a discharge capacitor C15.

Figure 2:
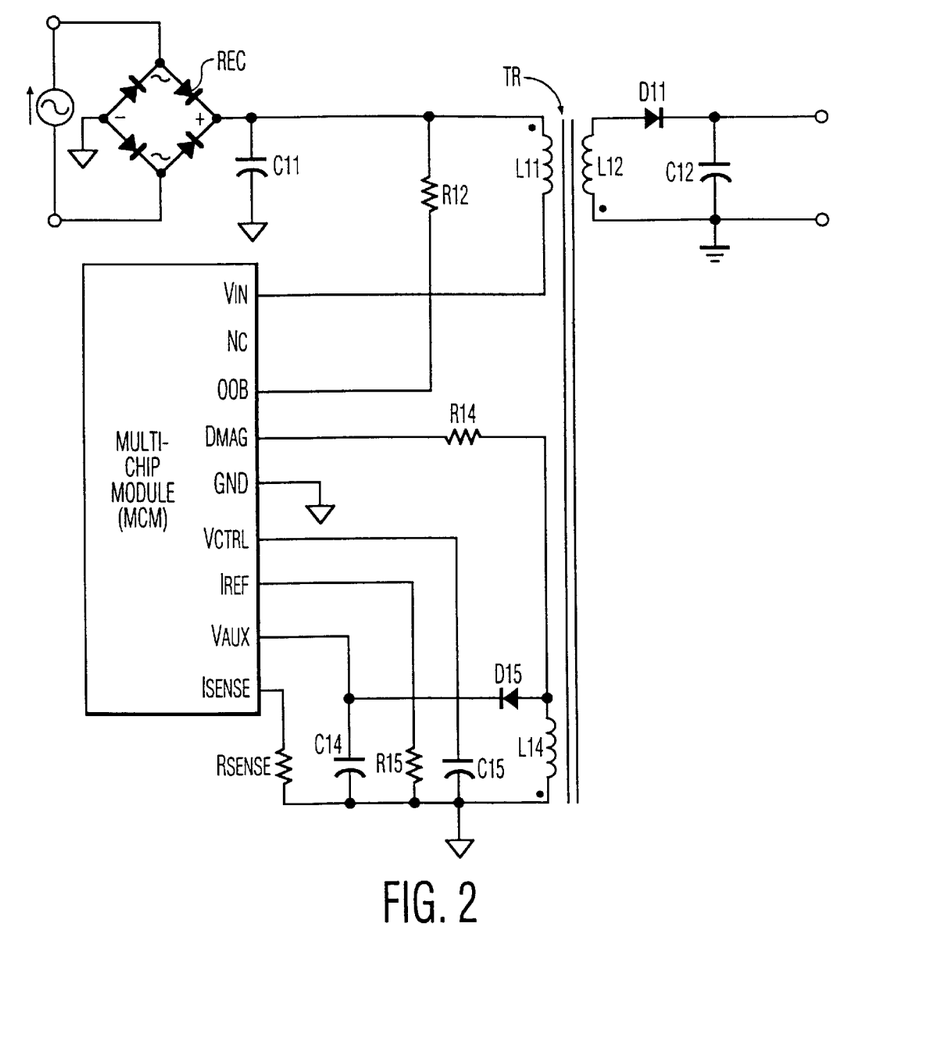
FIG. 2 is a simplified circuit diagram of relevant portions of the above switched-mode power supply in which the controller IC and the switching device are combined in a multi-chip module.

FIG. 2 is a simplified schematic drawing of relevant portions of the switched-mode power supply of FIG. 1 in which several components, including the controller IC and the switching device Tr11 are combined and encapsulated forming a multi-chip module MCM. The MCM includes an $I_{REF}$ input connected to ground via a resistor R15.

Figure 3:
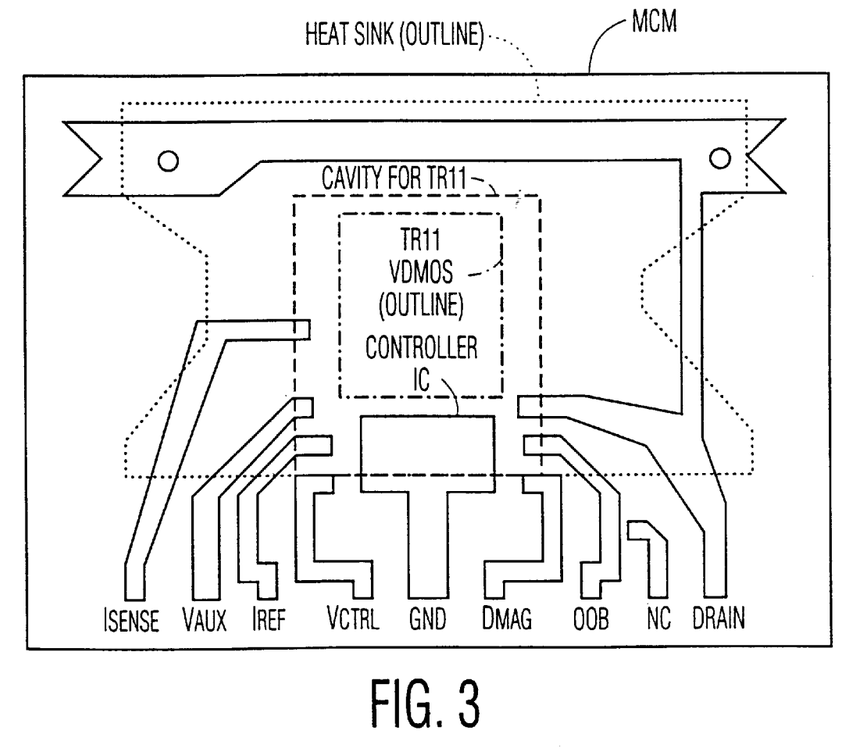
FIG. 3 is a view showing the arrangement of the components in the multi-chip module.
Figure 4:
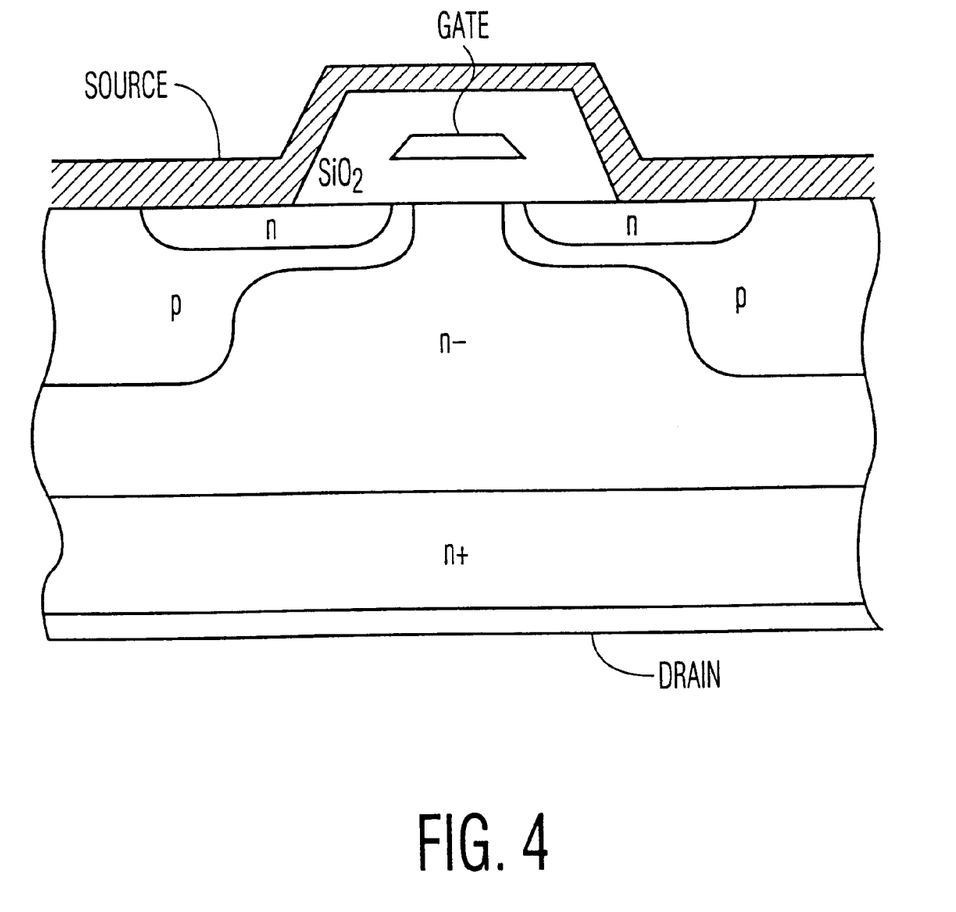
FIG. 4 is a cross-sectional view of the switching device.

FIG. 3 is a view of the MCM, partly in section, showing the arrangement of the components therein. The switching device Tr11, which, in this case is a vertical diffused MOSFET (VDMOS), includes a heat sink to which the drain is connected. As shown in FIG. 4, the heat sink/drain forms substantially the entire back plane of the VDMOS. The arrangement of the heat sink, the non-conductive encapsulating material and the paths to the various connections of the controller form parasitic capacitors which induce currents in the various connections. In particular, referring to FIG. 1, the drain of the switching device Tr11, when the switching device Tr11 is switched off, may reach voltages as high as 650V. Since the heat sink is at the same potential as the drain of the switching device Tr11, the heat sink then, at times, is at 650V. The change in voltage with respect to time (dv/dt) when the switching device Tr11 switches is usually very high, with typical values between 1 kV/μsec to 5 kV/μsec, depending upon the value of the drain snubber circuit (not shown). As the drain voltage goes up and down at a high dv/dt, a large capacitive current is either injected into or drawn out of the chip paths or components connected to the paths due to the presence of the parasitic capacitance. This current is not negligible and disturbs the operation of the chip.

Figure 5:
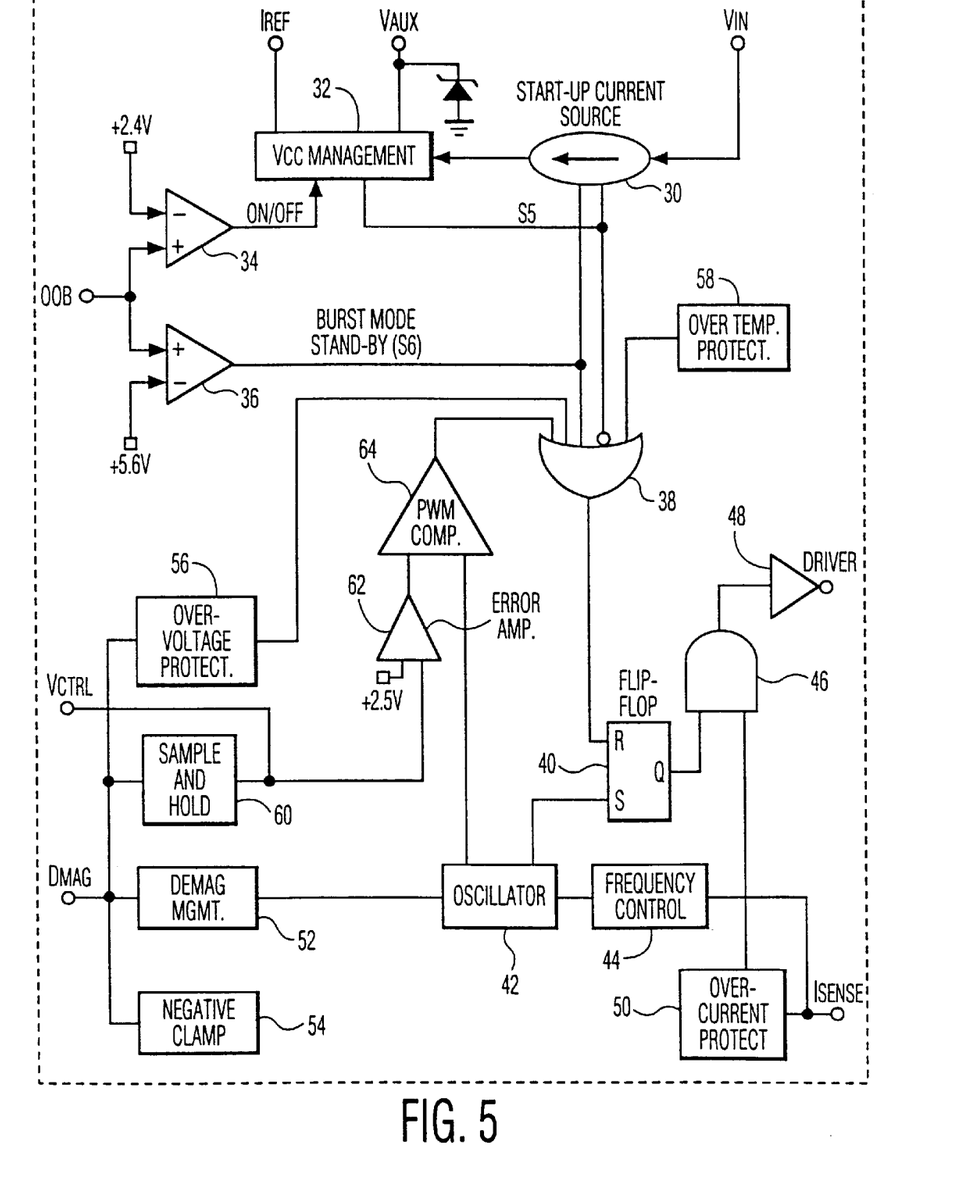
FIG. 5 is a block diagram of a known controller IC.

FIG. 5 shows a block diagram of a known controller IC. The controller IC includes a start-up current source 30 coupled to the $V_{IN}$ input and a Vcc management circuit 32 connected to the $V_{AUX}$ and $I_{REF}$ inputs. The OOB input is connected to a first comparator 34 for comparing the voltage thereon to +2.4V, and generates an "OFF/ON" signal. This OFF/ON signal is applied to an input of the Vcc management circuit 32. The OOB input is also connected to a second comparator 36 for comparing the voltage thereon to +5.6V, for generating a "Burst Mode Stand-by" signal S6. This signal S6 is applied to the start-up current source 30 and to a first input of an OR-gate 38. An output (S5) from the Vcc management circuit 32 is also applied to the start-up current source 30 and to an inverting second input of OR-gate 38. An output from OR-gate 38 is applied to the reset input of an RS flip-flop 40, the set input being connected to an output of an oscillator 42 which is connected to the output of a frequency control circuit 44 having an input connected to the $I_{SENSE}$ input. The Q output from the RS flip-flop 40 is connected to one input of an AND-gate 46 which has an output connected to a driver 48 for driving the switching device Tr11. The other input of the AND-gate 46 is connected to the output of an over-current protection circuit 50 which monitors the current through the VDMOS via the $I_{SENSE}$ input. The $D_{MAG}$ input is connected to a demagnetization management circuit 52 and a negative clamp 54 for protection against saturation of the inductor in the power supply. The presence of demagnetization protection guarantees discontinuous conduction mode operation which simplifies the design of feedback control and gives faster transient response for the system. An output from the demagnetization management circuit 52 is connected to the oscillator 42. In addition, the $D_{MAG}$ input is connected to an over-voltage protection circuit 56 having an output connected to a third input of the OR-gate 38, which also has a fourth input connected to the output of an over-temperature protection circuit 58.

The $D_{MAG}$ input is also connected to a sample-and-hold circuit 60 the output of which is connected to the $V_{CTRL}$ terminal of the controller IC and to one input of an error amplifier 62 which receives a 2.5V. reference voltage at another input. The output from the error amplifier 62 is connected to one input of a pulse width modulation (PWM) comparator 64 which receives an output from the oscillator 42 at a second input. The output from the PWM comparator 64 is connected to a fifth input of the OR-gate 38. The error amplifier 62 and the PWM comparator 64 form a PWM circuit which compares the voltage on the discharge capacitor C15, which is supposed to be a sampled representation of the output voltage, to the oscillator waveform to determine the duty cycle of the switching device.

Figure 6:
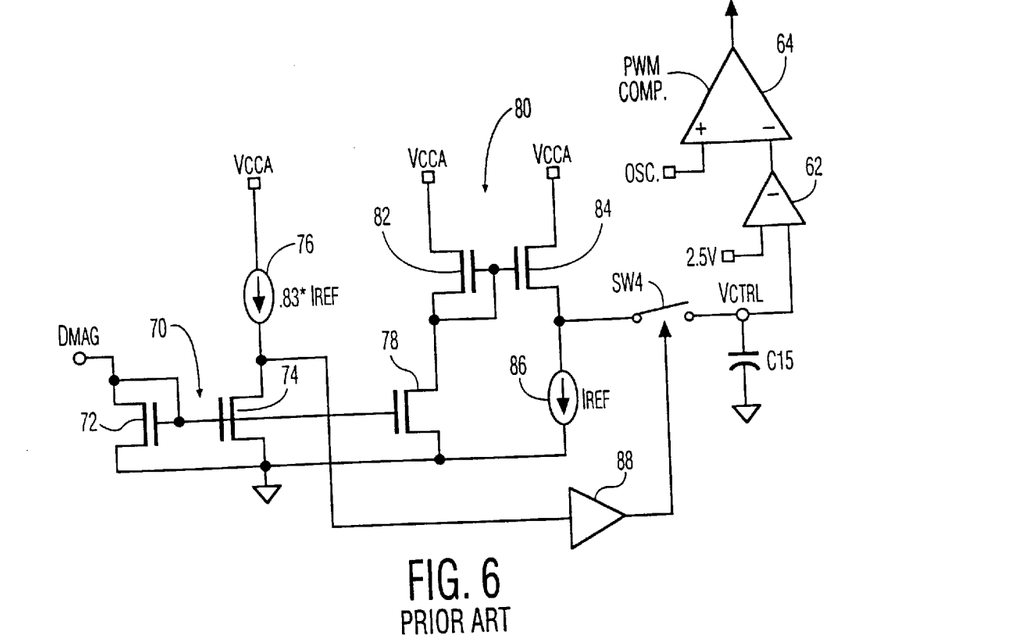
FIG. 6 is a schematic diagram a sample-and-hold circuit and a PWM circuit in said known controller IC.

FIG. 6 shows a schematic diagram of a sample-and-hold circuit disclosed in co-pending U.S. patent application Ser. No. 08/901,491, filed Jul. 28, 1997, to Applicants and assigned to the Assignee of the present invention. The $D_{MAG}$ input is connected to a current mirror 70 including MOSFETs 72 and 74 having interconnected gates and sources. In particular, the $D_{MAG}$ input is connected to the drain of MOSFET 72 which is connected to the interconnected gates. The interconnected sources of the MOSFETs 72 and 74 are connected to ground. Reference voltage $V_{CCA}$ is applied to a current source 76 which provide the current $0.83*I_{REF}$ to the drain of MOSFET 74. MOSFET 78, having its gate and source connected to the interconnected gates and sources, respectively, of MOSFETs 72 and 74, mirrors the current in current mirror 70 to current mirror 80 in which the drain of MOSFET 78 is connected to the source of MOSFET 82. The gates of MOSFETs 82 and 84 are interconnected while the drains of MOSFETs 82 and 84 receive the reference voltage $V_{CCA}$. The source of MOSFET 82 is connected to its gate. The source of MOSFET 84 is connected to ground through current source 86 which provides the current $I_{REF}$, and to one terminal of controllable switch Sw4. The other terminal of controllable switch Sw4 is connected to the $V_{CTRL}$ terminal which is connected to ground via the discharge capacitor C15. The $V_{CTRL}$ terminal is also connected to the input of the error amplifier 62. A comparator 88 compares the current in current mirror 70 with the current provided by the current source 76 and when this current is exceeded, applies a signal closing the controllable switch Sw4.

Figure 8A:
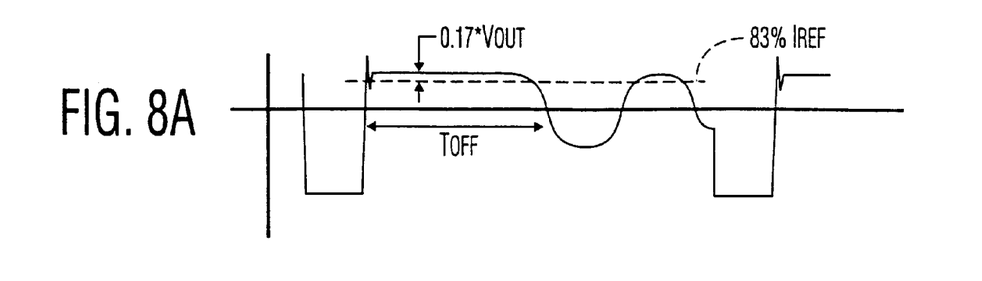
FIG. 8A shows a waveform of the voltage on the auxiliary winding.
Figure 8B:
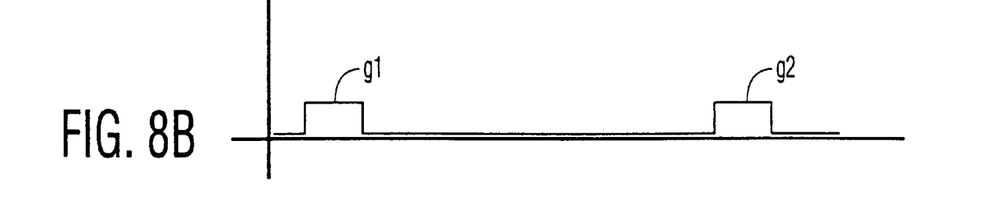
FIG. 8B shows a waveform of the gate drive of the switching device.
Figure 8C:
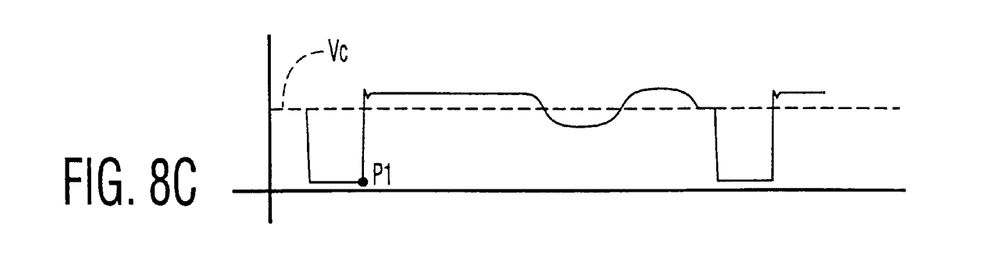
FIG. 8C shows a waveform of the voltage on the discharge capacitor.

The operation of the controllable switch Sw4 is dependent on the current injected into the $D_{MAG}$ input. This current is derived from the voltage on the auxiliary coil L14 via the resistor R14. FIG. 8A shows the voltage on the auxiliary coil L14. At the end of the gate pulse g1, shown in FIG. 8B, the switching device Tr11 turns off and the voltage in the auxiliary coil L14 rapidly rises. When the corresponding current rises above $0.83*I_{REF}$, the first comparator 88 closes the controllable switch Sw4 causing the current in the current mirror 80 to charge the discharge capacitor C15. The voltage on the discharge capacitor C15 then controls, through the error amplifier 62, the PWM comparator 64, the OR-gate 38, the flip-flop 40, the AND-gate 46, and the amplifier 48, the operation of the switching device Tr11. Without capacitive coupling, this voltage would typically be $V_C$, as shown in FIG. 8C.

In the event of capacitive coupling, when the switching device Tr11 closes and opens, due to the sharp change in voltage on the drain, a large current is induced in the $V_{CTRL}$ terminal which discharges and charges the discharge capacitor C15 to an abnormal extent. As such, the voltage on the discharge capacitor C15 tracks the voltage on the auxiliary coil L14 (see FIG. 8C). Due to the negative dv/dt, the voltage on the discharge capacitor C15 is pulled low and the too low voltage at point P1 is then used by the PWM circuit adversely affecting the regulation of the switching device Tr11.

Figure 7:
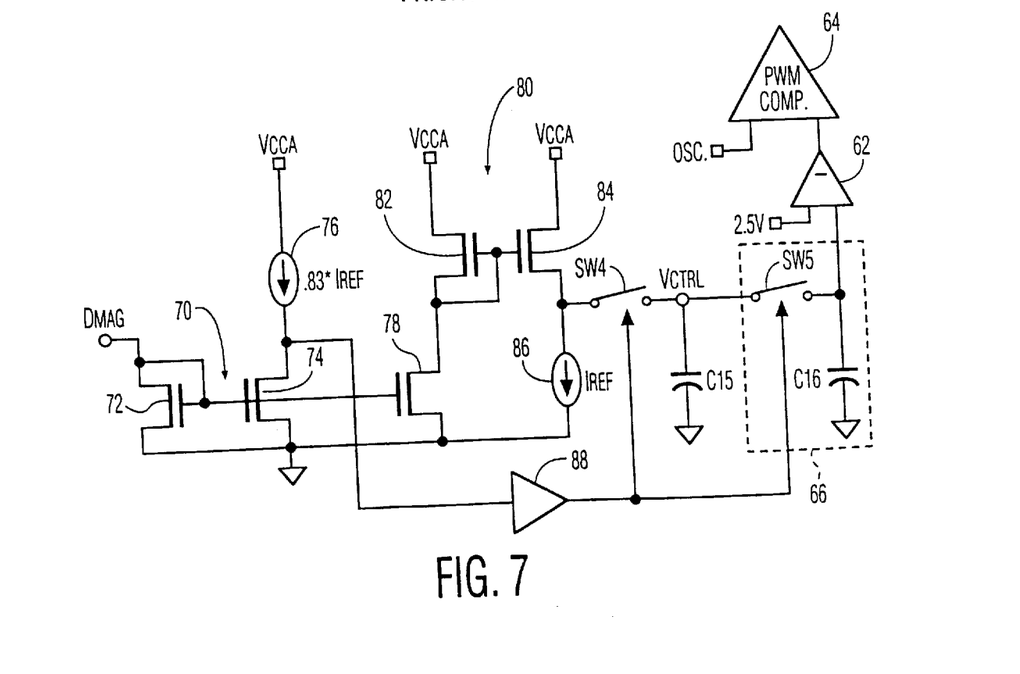
FIG. 7 is a schematic diagram showing a track-and-hold circuit of the subject invention included with the circuit of FIG. 6.

FIG. 7 shows a schematic diagram similar to that of FIG. 6 but now including the track-and-hold circuit of the subject invention. In particular, the track-and-hold circuit 66 includes a controllable switch Sw5 connecting the $V_{CTRL}$ to the input of the error amplifier 62. The output from the controllable switch Sw5 is connected to ground by a tracking capacitor C16. The controllable switch Sw5 is controlled in synchronism with the controllable switch Sw4 and also receives the switching signal from the comparator 88.

Figure 8D:
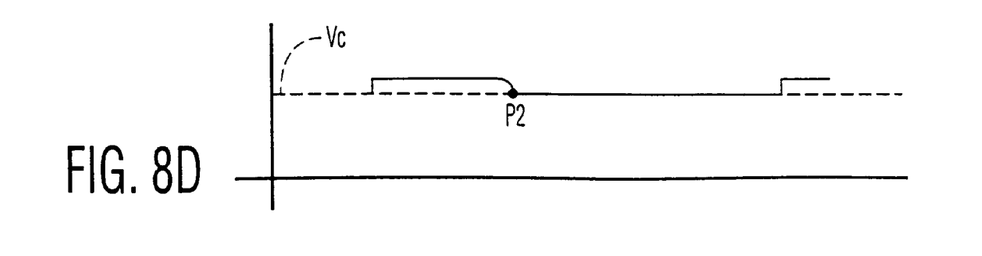
FIG. 8D shows a waveform of the voltage on the tracking capacitor.

In the event of capacitive coupling, since Sw5 is already open and the tracking capacitor C16 has the same voltage across it as was across the discharge capacitor C15 during the last time controllable switches Sw4 and Sw5 were closed (see FIG. 8D), any change in the voltage across capacitor C15 due to capacitive coupling will have no effect on the regulation of the switching device Tr11, i.e., the voltage at point P2 in FIG. 8D will be used by the PWM circuit.

Figure 9:
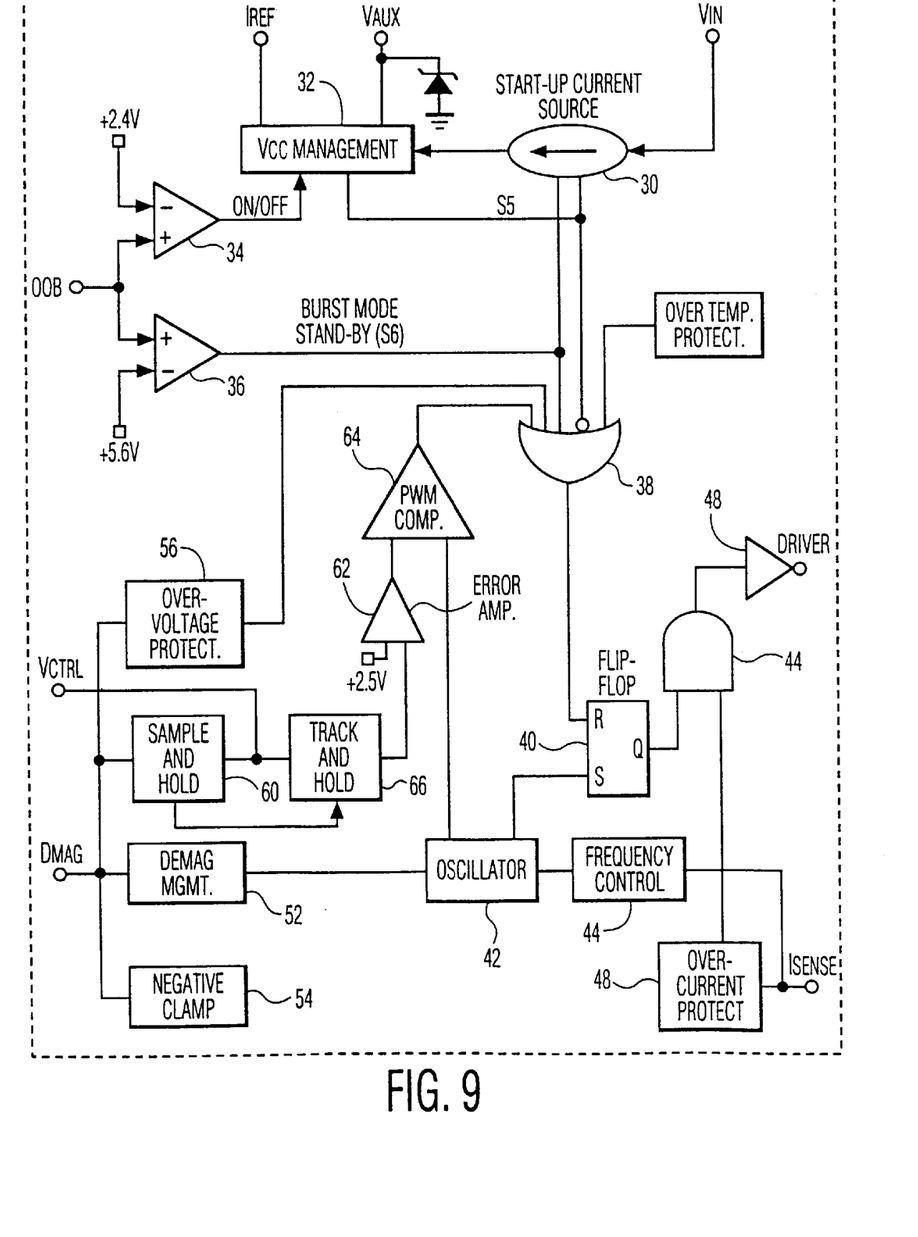
FIG. 9 shows a block diagram of the controller IC including the track-and-hold circuit.

The tracking capacitor C16 itself is immune to capacitive coupling as it is integrated into the controller IC. This is shown in the block diagram of the controller IC in FIG. 9 in which the track-and-hold circuit 66 is shown internal to the controller IC.

Figure 10A:
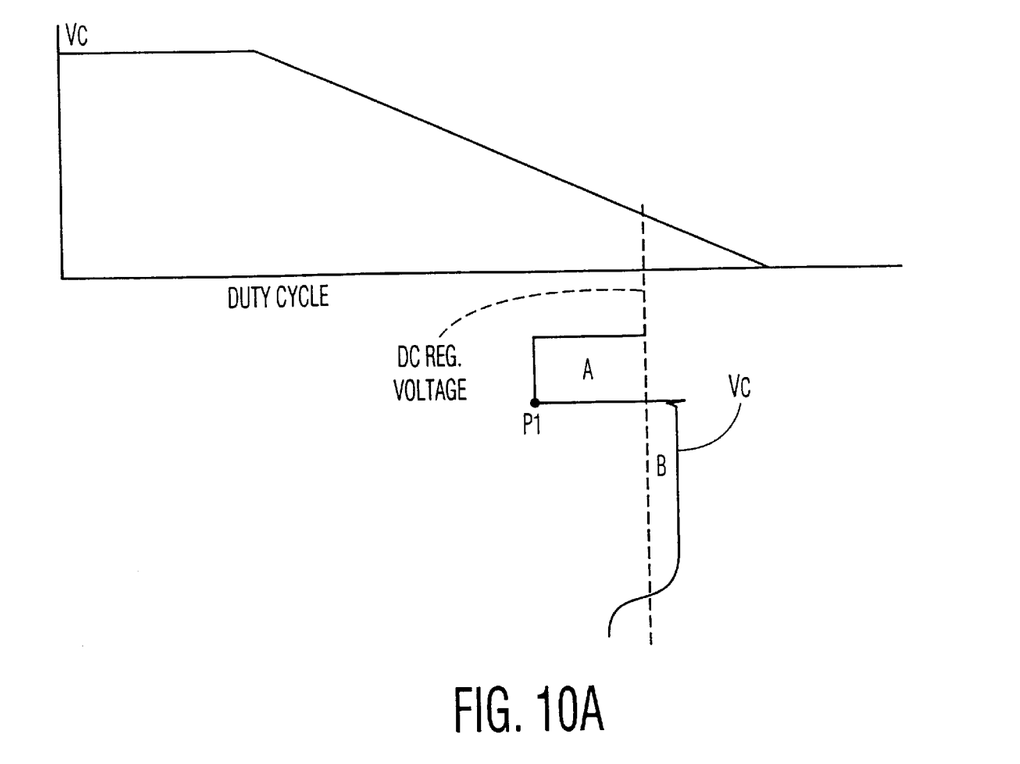
FIG. 10A shows waveforms illustrating the relation between the voltage on the discharge capacitor and the duty cycle under normal operating conditions.
Figure 10B:
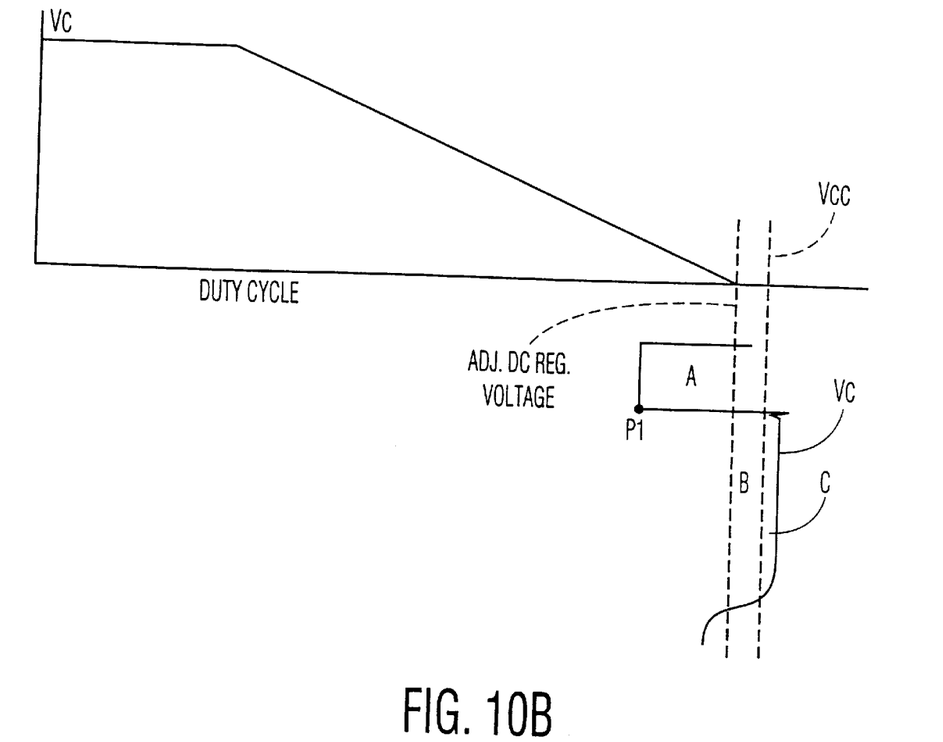
FIG. 10B shows the waveforms of FIG. 10A subjected to capacitive coupling.
Figure 10C:
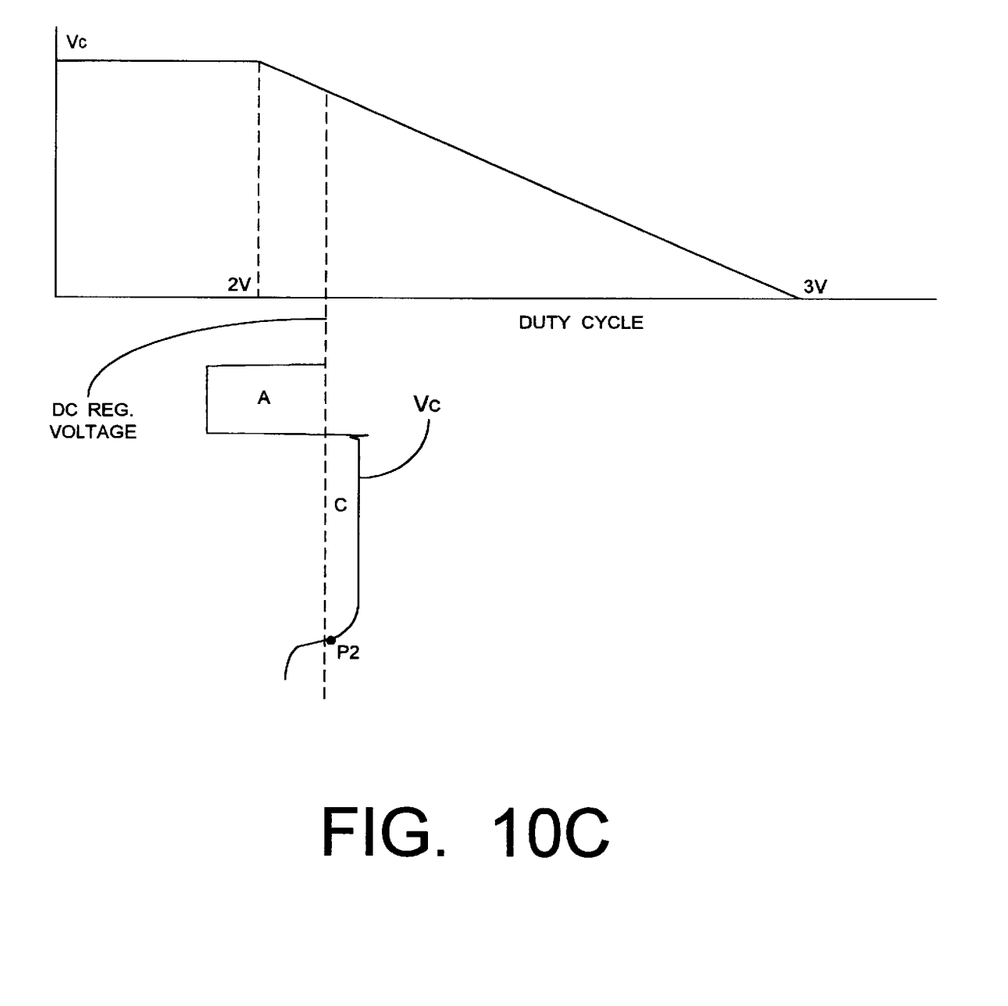
FIG. 10C shows the waveforms of FIG. 10A with the addition of the track-and-hold circuit.

FIGS. 10A–10C will now be used to show the effects of this capacitive coupling on the duty cycle. Capacitive coupling causes a scaled down version of the voltage waveform on the drain of the switching device Tr11 to be superimposed on the voltage on the discharge capacitor C15 connected to the $V_{CTRL}$ terminal (see FIGS. 8A–8C). It should be noted that the auxiliary winding voltage has an AC component that is similar in shape to the drain voltage of the switching device Tr11. The discharge capacitor C15 voltage $V_C$ is then used for regulation of the output voltage. FIG. 10A graphically shows the relationship between $V_C$ and the duty cycle without the benefit of the track-and-hold circuit 66. The coupling waveform superimposed on the $V_C$ voltage is an AC waveform. That is, the areas A and B are equal and cancel each other. Area A is subtracted from the DC offset on $V_C$ and area B is added to the DC offset. Area A is very dependent on the input voltage while area B depends on the output voltage and is constant for a fixed load. The instantaneous voltage used for regulation is shown as point P1. This voltage is equal to the DC offset of $V_C$ minus the coupled input voltage. The voltage at P1 is inverted by the error amplifier 62 and the output is used by the PWM comparator 64 to set the duty cycle of the system.

The problem arises at low duty cycles. At low duty cycles which are, in part, caused by inordinately large currents induced into the discharge capacitor C15 due to capacitive coupling, $V_C$ can increase to a point where it is larger than the supply voltage $V_{CCA}$ and is therefore clipped (see FIG. 10B). The areas A and B are no longer equal with the result that the DC voltage on $V_C$ drops leading to a larger duty cycle. The system responds by increasing this DC voltage through the sample-and-hold circuit 60. The point P1 moves to a higher voltage giving a lower duty cycle and so does the peak value of $V_C$ leading to further clipping. The system tries to adjust this by further increasing the DC offset of $V_C$. This continues until the point P1 is greater than 3.5V, which is the upper limit of the oscillator signal. The duty cycle of the system now goes to zero and switching stops. Hence, due to the clipping, the duty cycle cannot be achieved and the system goes out of control.

Switching resumes once $V_C$ is brought below 3.5V by the controller IC. However, the system quickly gets stuck again.

The addition of the track-and-hold circuit 66 solves this problem by copying the $V_C$ voltage and storing it on an internal tracking capacitor C16. This voltage is protected from the effects of capacitive coupling by the opening of controllable switch Sw5 which disconnects the tracking capacitor C16 from the $V_{CTRL}$ terminal. The voltage stored on the tracking capacitor C16 also has a small voltage component on it that is contributed by capacitive coupling (see FIG. 8D). This voltage is equal to:

$$(C_{COUPLING}/C15)*(V_{OUT}*0.17)$$

As the discharge capacitor C15 is much larger (typically 1 nF) than the coupling capacitance 0.5 pF), the voltage coupling is small. For a $V_{OUT}$ of 100V, the coupled voltage is 8.5 mV on a DC offset of 2V. Point P2 in FIG. 8D shows the instantaneous voltage that is stored on the tracking capacitor C16. It is important to note that the voltage contributed by the capacitive coupling is dependent upon the output voltage and not the input voltage. For a fixed load, this coupled voltage will therefore be fixed.

As shown in FIG. 10C, with the track-and-hold circuit 66, the area C is not AC coupled and has to be compensated by the regulation loop. The area C is already small (for $V_{OUT}$= 100V, C=8.5 mV*$T_{OFF}$) and can be compensated by lowering the DC offset of the regulation voltage. It should be noted that as opposed to the case where only the sample-and-hold circuit 60 was used and a problem existed at low duty cycles, a possibility of a problem now exists at larger duty cycles. However, since the controller IC has a maximum duty cycle limit of 80%, more headroom is available for the regulation loop.

Figure 11:
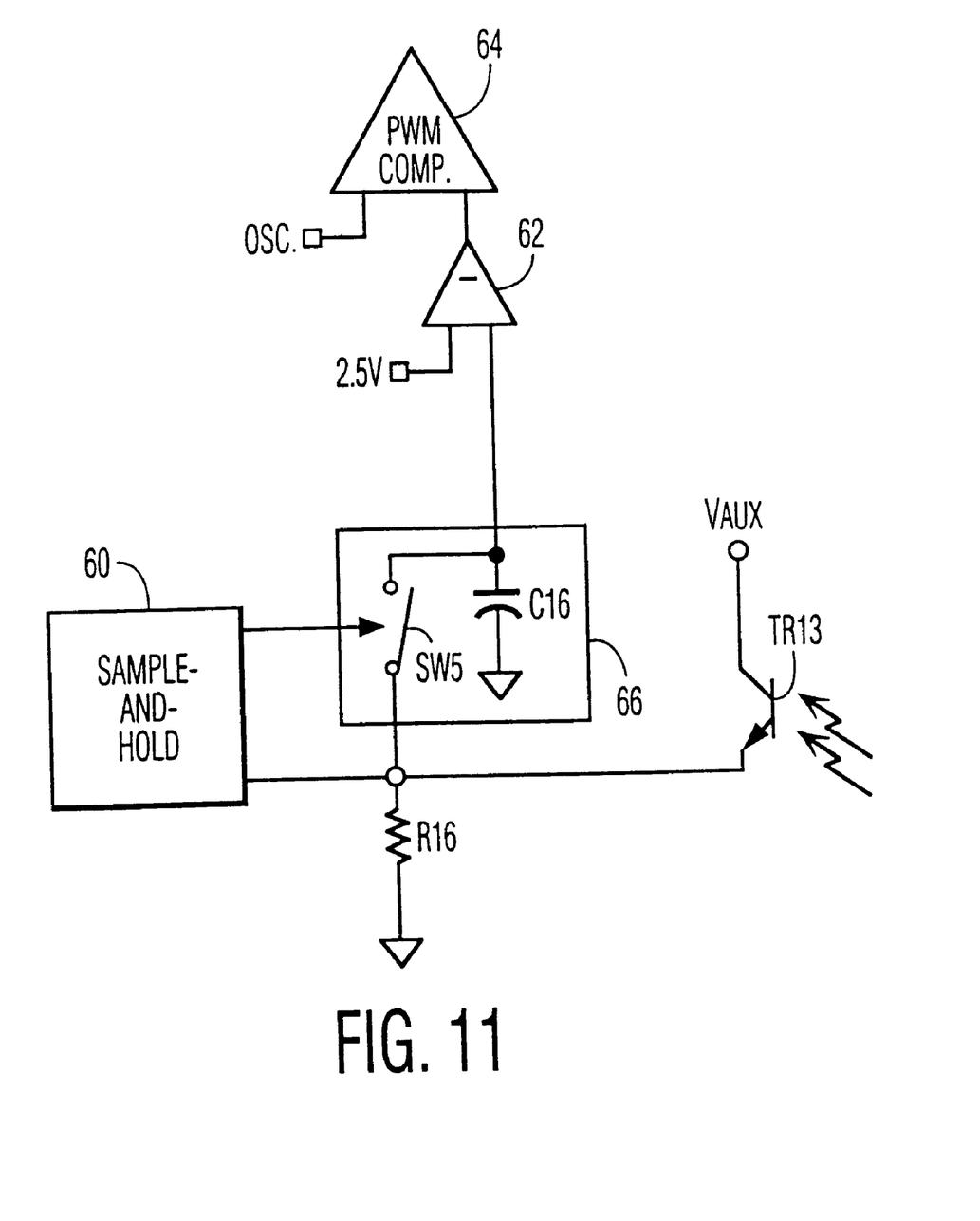
FIG. 11 is a schematic block diagram of a portion of the controller with a track-and-hold circuit used in a secondary sensing configuration.

It should be noted that while the circuit of FIG. 7 is based on primary sensing, the circuit may also be used in the case of secondary sensing. In particular, as shown in FIG. 11, discharge capacitor C15 of FIG. 7 is now replaced by a resistor R16 which is fed a current by a sensor Tr13 of an opto-coupler, the emitter (not shown) of which is controlled by the output voltage. This current is usually on the order of 1–3 mA. As such, the sample-and-hold circuit 60 does not play a role in determining the duty cycle of the operation. Instead, the duty cycle is set by the opto-coupler feeding the resistor R16 connected to the $V_{CTRL}$ terminal. During sampling, a small current (several $\mu A$'s) from the sample-and-hold circuit 60 still flows into and out of the $V_{CTRL}$ terminal. However, this current is negligible compared to the opto-coupler current, and its effect can be ignored. The sampling window sensed by the sample-and-hold circuit 60 still plays an important role. During the sampling window, the voltage on the resistor R16 is transferred to the track-and-hold circuit 66 tracking capacitor C16. Similar to the primary sensing operation, the tracking capacitor C16 voltage is then used in the next frequency cycle to set the duty cycle of operation.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A controller for controlling a switched-mode power supply having a transformer with a primary winding, an auxiliary winding and a secondary winding, and a switching device coupled in series with the primary winding, a voltage on said auxiliary winding being dependent on an output voltage on said secondary winding, said controller having an input coupled to said auxiliary winding for receiving a current proportional to said voltage, and a control terminal having a discharge capacitor coupling the control terminal to ground, a voltage across said discharge capacitor being used by circuitry in said controller for controlling the switching of said switching device, a sample-and-hold circuit having an input coupled to the input of the controller for receiving said current, a comparator for comparing said current to a reference current, and a controllable switch having an input coupled to receive said current, an output coupled to said control terminal of said controller, and a control input coupled to an output of said comparator, characterized in that said controller further comprises a track-and-hold circuit coupled between said control terminal and said circuitry in said controller, said track-and-hold circuit having a control input also coupled to the output of said comparator in said sample-and-hold circuit, whereby, under normal operating conditions, said track-and-hold circuit mirrors the voltage across said discharge capacitor, and whereby under abnormal conditions in which capacitive coupling withdraws a large current from said discharge capacitor, said track-and-hold circuit isolates said circuitry in the controller from an erroneous voltage across said discharge capacitor due to said withdrawn current.

2. A controller as claimed in claim 1, characterized in that said track-and-hold circuit comprises a controllable switch having an input coupled to said control terminal, an output, and a control input coupled to the output of the comparator of said sample-and-hold circuit, and a tracking capacitor coupling the output of said controllable switch to ground, the output of said controllable switch forming the output of said track-and-hold circuit.

3. A controller as claimed in claim 2, characterized in that said controller is integrated into a single chip and said controllable switch and said tracking capacitor of said track-and-hold circuit are also integrated into said single chip.

4. A controller for controlling a switched-mode power supply having a transformer with a primary winding, an auxiliary winding and a secondary winding, and a switching device coupled in series with the primary winding, a voltage on said auxiliary winding being dependent on an output voltage on said secondary winding, said controller having an input coupled to said auxiliary winding for receiving a current proportional to said voltage, and a control terminal having a resistor coupling the control terminal to ground, said resistor being fed a current from a opto-coupler which is controlled by said output voltage, a voltage across said resistor being used by circuitry in said controller for controlling the switching of said switching device, a sample-and-hold circuit having an input coupled to the input of the controller for receiving said current, a comparator for comparing said current to a reference current, and a controllable switch having an input coupled to receive said current, an output coupled to said control terminal of said controller, and a control input coupled to an output of said comparator, characterized in that said controller further comprises a track-and-hold circuit coupled between said control terminal and said circuitry in said controller, said track-and-hold circuit having a control input also coupled to the output of said comparator in said sample-and-hold circuit, whereby, under normal operating conditions, said track-and-hold circuit mirrors the voltage across said resistor, and whereby under abnormal conditions in which capacitive coupling withdraws a large current from said resistor, said track-and-hold circuit isolates said circuitry in the controller from an erroneous voltage across said resistor due to said withdrawn current.

\* \* \* \* \*